April 13, 1937. F. W. OFELDT 2,077,257
SPRAY PRODUCING METHOD AND APPARATUS
Filed Jan. 3, 1935
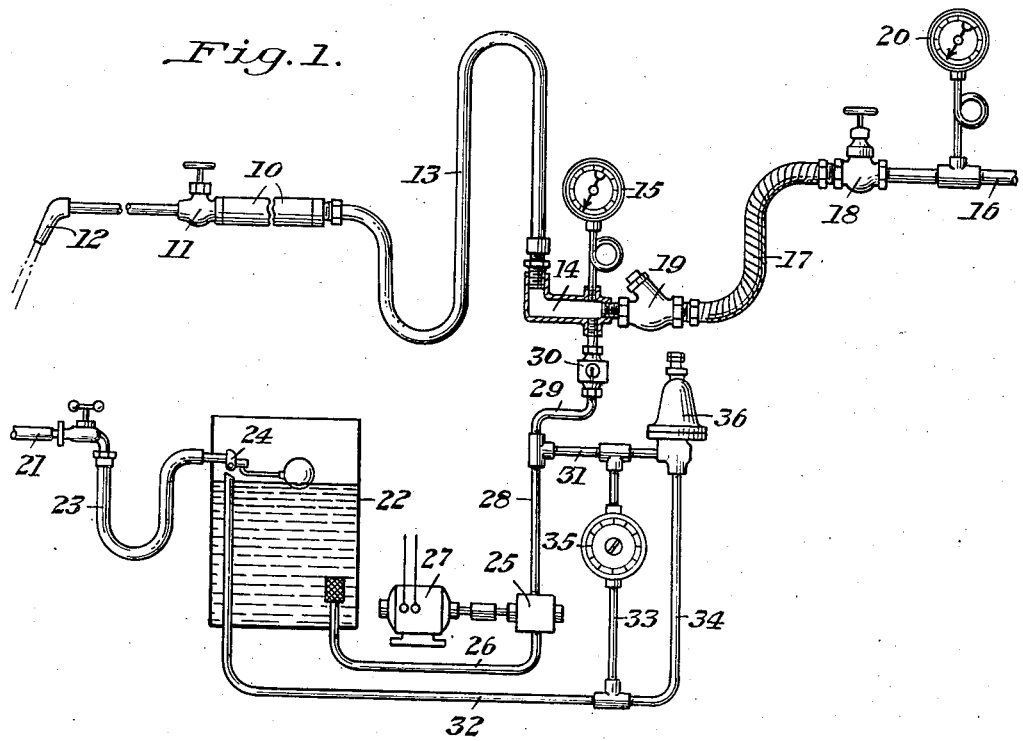
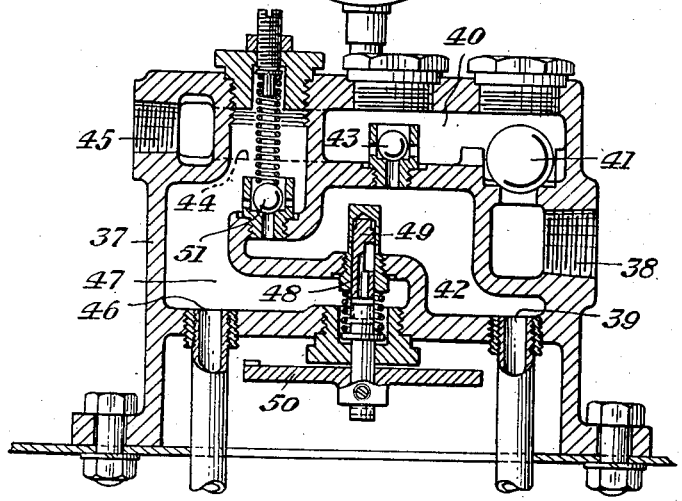
INVENTOR
Frank W. Ofeldt
by his attorneys
Byrnes, Stebbins & Blenko Patented Apr. 13, 1937

2,077,257

UNITED STATES PATENT OFFICE 2,077,257

SPRAY PRODUCING METHOD AND APPARATUS

Frank W. Ofeldt, McKeesport, Pa.

Application January 3, 1935, Serial No. 223

6 Claims. (Cl. 299—84)

My invention relates to the production of a fluid jet for cleaning, spraying, and other purposes.

It has now been fully established that a mixture of steam and water moving at high velocity constitutes a very effective cleaning and spraying agent. In my prior Patents Nos. 1,855,866, 1,925,643, and 1,970,971, I have disclosed and claimed methods and apparatus for producing such sprays, wherein the steam is generated adjacent the point of application of the spray. It frequently happens that it is desired to utilize a cleaning or spraying apparatus in locations where a supply of steam is already available. It is an object of this invention, therefore, to provide for the production of a cleaning or other spray by using existing sources of steam, and otherwise to improve upon the methods and apparatus disclosed in my patents above mentioned.

In accordance with my invention, I provide a mixing chamber and introduce thereto at an angle to each other, streams of steam and water under pressure. By lowering the pressure in the mixing chamber, as by opening a discharge vent, the resulting expansion of the steam creates a jet of a mixture of steam and water constituting a very effective cleaning and spraying agent.

I also provide means for varying the ratio between the amounts of water and steam supplied in a given time whereby to control the character of the spray.

For a complete understanding of the invention, reference is made to the accompanying drawing illustrating a preferred embodiment with certain modifications. In the drawing:

Figure 1 is a diagrammatic illustration of the apparatus; and

Figure 2 is a transverse sectional view through a mixing device combining the functions of several of the separate parts of Figure 1.

Referring now in detail to the drawing and, for the present, to Figure 1, a so-called spray "gun" 10 has a control valve 11 and a nozzle 12 for directing a jet of a mixture of steam and water onto the object to be cleaned or sprayed. The gun 10 is connected by a conduit 13, preferably a flexible hose, to a mixing chamber 14. A pressure gauge 15 indicates the pressure in the chamber 14.

Steam is supplied to the chamber 14 from any convenient source 16 adapted to maintain a constant pressure, through a supply conduit 17 having a control valve 18 therein. A check valve 19 is disposed between the conduit 17 and the mixing chamber 14. A pressure gauge 20 indicates the pressure of the steam supplied from the source 16.

Water is obtained from any convenient source indicated at 21 and is supplied first to a storage chamber 22 through a conduit 23, under the control of a float valve 24, whereby a substantially constant volume of water is maintained in the chamber. Water is drawn from the chamber 22 by a pump 25 through a conduit 26. A motor 27 drives the pump 25.

The pump 25 discharges water at a substantially constant rate through a conduit 28. A branch conduit 29 delivers water through a check valve 30 to the mixing chamber 14. It will be observed that the streams of steam and water flowing into the chamber 14 are at right angles, whereby a thorough mixture and atomization occurs.

A by-passing conduit 31 also branches from the conduit 28, for returning excess water to the chamber 22 through a conduit 32. Water flows from the conduit 31 to the conduit 32 through one of two connecting conduits 33 and 34. The rate of flow through the conduit 33 is controlled by a metering valve 35. A relief valve 36 normally prevents the flow of fluid through the conduit 34 until the pressure in the conduits 28, 29 and 31 reaches a predetermined value.

The pump 25 is preferably operated at substantially constant speed to provide a uniform rate of delivery of water. The extent to which the metering valve 35 is opened, therefore, determines the amount of water which will be returned to the chamber 22 through the conduit 32 and, therefore, the amount of water which is delivered to the mixing chamber 14. Since the chamber 22 is at substantially atmospheric pressure, water will flow through the metering valve 35 until a pressure is built up on the discharge side of the pump sufficient to force water into the mixing chamber 14.

When the apparatus described above is to be operated to carry out the method of my invention, the control valve 11 of the gun 10 is first closed. The motor 27 is then started to provide a supply of water under pressure. As long as the control valve 11 remains closed, the pump operates simply to build up the maximum pressure of which it is capable in the chamber 14 and the conduit 13. The check valve 19 prevents the flow of water back through the steam supply conduit 17. The water discharged by the pump is then returned to the chamber 22 through the conduit 32. Water flows through the conduit 33 to the extent permitted by the opening of the valve 35. The remainder of the water passes through the valve 36 and the conduit 34, the former being opened by the pressure built up in the system. These conditions remain unchanged until steam is introduced into the system and the control valve 11 opened.

When it is desired to start the spraying operation, the steam valve 18 and the control valve 11 are opened and the steam flows through the conduit 17, the check valve 19, and into the mixing chamber 14. The opening of the valve 11 permits the discharge of the water which initially fills the chamber 14 and the conduit 13. This reduction in the pressure within the mixing chamber 14 causes additional water to be supplied thereto, to mix with the steam. The reduction of the pressure within the mixing chamber relieves the pressure in the conduit 29 so that the relief valve 36 closes and the water discharged from the pump enters the mixing chamber save for that which returns through the metering valve 35. The streams of water and steam entering the mixing chamber at right angles are thoroughly mixed and the water is effectively atomized. The reduction of the pressure on the steam as it enters the mixing chamber causes it to expand and force the particles of water out of the nozzle 12 in finely divided form.

The outflowing mixture of steam and water strikes the walls of the chamber 14 in making the right-angle bend to the outlet thereof to which the conduit 13 is connected. This further aids the breaking up of the water stream and insures a through mixture of the steam therewith.

The character of the spray can be controlled as to the amount of water entrained therewith by operating the valve 35. The smaller the opening provided by the valve 35, the more water is supplied to the mixing chamber, and vice versa. I am thus able to obtain a jet from the nozzle 12 which is almost entirely dry steam by opening the valve 35 to its widest extent, as well as to obtain a jet which carries the maximum amount of water, by closing the valve 35. All intermediate conditions are also easily obtainable so that the character of the spray can be suited to the nature of the work in hand.

When the spraying operation has been completed, the control valve 11 is closed. The pressure within the mixing chamber immediately rises and may even exceed that of the steam supply source. The check valve 19, however, prevents the back flow of water into the steam supply system. In case the pressure of the steam source should be greater than that created by the pump 25, the check valve 30 prevents the entrance of steam into the water supply system.

The building up of pressure in the chamber on closing the valve 11 is immediately reflected in the conduits 29 and 31. The relief valve 36 then opens to permit the water delivered by the pump 25 to be returned to the storage chamber 22. This valve is preferably set to open at a pressure higher than that of the steam supply source. These conditions continue until the nozzle control valve 11 is again opened. If it is desired to shut down the apparatus permanently, of course, the valve 18 would be closed and the motor 27 stopped.

Figure 2 illustrates a device which incorporates the functions of several elements shown in Figure 1, including the mixing chamber 14, check valves 19 and 30, the metering valve 35 and the relief valve 36. This device comprises a casting 37 having a steam inlet port 38 to which a supply conduit, such as that shown at 17, may be connected, and a water inlet port 39 to which a water supply conduit, such as that shown at 29, may be connected. A mixing chamber 40 is formed in the casting and is adapted to receive steam from the port 38 through a check valve 41. The chamber 40 corresponds to the chamber 14 of Figure 1, and the valve 41 to the check valve 19. Water entering the port 39 flows through a passage 42 and thence through a check valve 43 into the chamber 40. A passage 44 connects an outlet port 45 to the chamber 40 and is adapted to receive a discharge conduit such as that indicated at 13 of Figure 1.

A water outlet port 46 opens into a passage 47 in the casting 37. A metering valve 48 controls the by-passing of water from the passage 42 to the passage 47 and the port 46. This valve corresponds to that shown at 35 in Figure 1. It comprises a recessed stem 49 and an operating disc 50, which may be graduated as indicated in Figure 1 for cooperation with a suitable index. The size of the valve opening is proportional to the angle through which the disc is turned from the closed position.

A relief valve 51 corresponding to the relief valve 36, is adapted to permit the flow of water from the passage 42 into the passage 47 when the pressure in the former is sufficient to open the valve.

It will be apparent from the foregoing description and explanation that my invention provides a simple yet very effective method and apparatus for producing a jet for cleaning or spraying, in locations where existing facilities include a source of steam under pressure. The necessary apparatus is of relatively small size and, therefore, light in weight so as to be easily portable from one location to another. The apparatus, at the same time, is relatively inexpensive to manufacture and is very simple to maintain and operate so that no large amount of skill on the part of the user is necessary.

A particular advantage of the invention is that by controlling the volume of water indirectly on the by-pass line, instead of on the main supply line, the maximum pressure between the pump and the mixing chamber during spraying is simply the pressure of the steam supply by the source 16. If the metering valve 35 were in the main supply conduit 28, however, the pump would have to operate at a pressure higher than the steam pressure, during spraying. A further advantage is that, during the cessations of operations, the only adjustment necessary is the closing of the control valve 11, the apparatus being effective automatically to by-pass the water which is delivered by the pump in substantially constant volume.

When using the invention for cleaning or spraying, it may be desirable to introduce various types of material in solution or suspension and my invention permits this to be done very readily. The dissolved or suspended matter can be introduced into the water in the storage chamber, or may be injected into the stream of the steam-water mixture at or adjacent the gun.

Although I have illustrated and described herein but one preferred embodiment of the apparatus and practice of the method of my invention, it will be understood that numerous changes therein may be made without departing from the spirit of the invention or the scope of the appended claims.

I claim:

1. In a method of producing and controlling a mixture of steam and a liquid, the steps including supplying steam at a substantially constant pressure to a mixing chamber, supplying the liquid to a point in communication with said chamber at a substantially constant volume, venting said chamber to atmosphere to discharge the mixture at will, preventing backing up of the mixture toward the steam supply, and relieving the pressure of the liquid which increases when the chamber is not vented, only when it exceeds the pressure of the steam from said source.

2. Apparatus for producing and controlling a mixture of steam and a liquid comprising a substantially constant-pressure source of steam, a substantially constant-volume supply of the liquid, a mixing chamber connected to said source and supply, a discharge device connected to the chamber and having a control valve therein, a non-return valve connected between the steam source and the chamber, a by-pass connection from the chamber to the liquid supply and a relief valve in said connection, effective to by-pass a portion of the liquid supplied when the pressure of the liquid increases due to the operation of said control valve.

3. Apparatus for producing a cleaning or spraying jet comprising a mixing chamber having an outlet, a discharge nozzle connected to said outlet, an inlet into the chamber for steam, means for supplying water to said chamber under a pressure at least equal to that of the steam whereby to effect an intimate mixture of the steam and water and the creation of a high velocity jet at said nozzle, a metering by-pass for the water supply means, means for controlling the capacity of the by-pass, a second by-pass for the water supply means, and a relief valve in said second by-pass.

4. Apparatus for producing a cleaning or spraying jet comprising a mixing chamber, an outlet therefor, means for supplying to the said chamber one of the fluids to be mixed, a metering chamber adjacent said mixing chamber, a pump for delivering another fluid from a source of supply to said metering chamber, a connection between said chambers including a check valve, a by-pass extending from said metering chamber to said source of supply, and a control valve in said metering chamber controlling the amount of fluid by-passed therefrom to said source.

5. A mixing device comprising a casing, a mixing chamber formed therein, an inlet for supplying fluid thereto, a conduit connected to the inlet, an outlet leading from said chamber, a fluid supply chamber formed in said casing adapted to deliver fluid to the mixing chamber, an inlet for said fluid supply chamber, a check valve between said chambers, a fluid relief chamber in said casing adapted to receive fluid from the fluid supply chamber, a conduit communicating with said relief chamber, a passage between said two-last mentioned chambers, and a relief valve in said passage.

6. The apparatus defined by claim 5 characterized by a passage between the supply chamber and the relief chamber, and a by-passing valve controlling said last-mentioned passage.

FRANK W. OFELDT.